US007146018B2

(12) United States Patent
Tamayama

(10) Patent No.: US 7,146,018 B2
(45) Date of Patent: Dec. 5, 2006

(54) MULTICHANNEL ACOUSTIC SIGNAL REPRODUCING APPARATUS

(75) Inventor: Ryuzo Tamayama, Kanagawa (JP)

(73) Assignee: Sony Corporation (JP)

( * ) Notice: Subject to any disclaimer, the term of this patent is extended or adjusted under 35 U.S.C. 154(b) by 159 days.

(21) Appl. No.: 09/929,326

(22) Filed: Aug. 14, 2001

(65) Prior Publication Data

US 2002/0048381 A1 Apr. 25, 2002

(30) Foreign Application Priority Data

Aug. 18, 2000 (JP) .......................... P2000-248717

(51) Int. Cl.
*H04R 5/02* (2006.01)
*H04R 5/00* (2006.01)
*H04N 5/60* (2006.01)

(52) U.S. Cl. ...................... 381/300; 381/307; 381/310; 381/1; 381/17; 348/738

(58) Field of Classification Search ............... 381/300, 381/310, 307
See application file for complete search history.

(56) References Cited

U.S. PATENT DOCUMENTS 4,070,546 A * 1/1978 Hirota ........................ 381/300
5,533,129 A * 7/1996 Gefvert ...................... 381/300
5,896,358 A * 4/1999 Endoh et al. ................. 369/89
6,167,140 A * 12/2000 Watanabe ................... 381/123
6,473,135 B1 * 10/2002 Iwamura ..................... 348/706
6,574,339 B1 * 6/2003 Kim et al. .................... 381/17

OTHER PUBLICATIONS

Applicant's admitted prior art , Figures 6A and 6B, Description of Related Art*
The applicant's admitted prior art, Figures 6A,6B, pp. 1-3, Description of the Related Art.*

* cited by examiner

*Primary Examiner*—Vivian Chin
*Assistant Examiner*—Devona E. Faulk
(74) *Attorney, Agent, or Firm*—Lerner, David, Littenberg, Krumholz & Mentlik, LLP

(57) ABSTRACT

A system reproducing surround phonic sound is simply constructed by a multichannel acoustic signal reproducing apparatus having at least a DVD reproducing section. A DVD, a CD, a radio or the like and speakers are provided integrally with the multichannel acoustic signal reproducing apparatus and the integral system is made movable. The acoustic signal reproducing apparatus is connected to a television receiver by an IEEE1394 interface or a USB interface. Speakers of the television receiver are used as main speakers and the speakers of a multichannel acoustic signal reproducing apparatus main body are used as sub-speakers such as rear speakers. The main speakers are controllable from the main body side.

15 Claims, 6 Drawing Sheets

MULTICHANNEL ACOUSTIC SIGNAL REPRODUCING APPARATUS

BACKGROUND OF THE INVENTION

1. Field of the Invention

The present invention relates to a multichannel acoustic signal reproducing apparatus reproducing a DVD (Digital Versatile Dise or the like, and having sound field control means for obtaining surround phonic sound.

2. Description of the Related Art

There is known hitherto a DVD apparatus wherein multichannel acoustic signals are incorporated as a home Dolby sound system to obtain the presence and reality of sound.

FIG. 6A is a conceptual view showing the arrangement of the speakers of a conventional DVD Dolby sound system (5-1 channel system).

In FIG. 6A, reference symbol 1 denotes a sound field space, 2 denotes an audience, 3 denotes a recording and reproducing apparatus main body. As shown in FIG. 6B, the recording and reproducing apparatus main body 3 has a television receiver (TV) 17 projecting a video signal onto a CRT 12, a DVD recording and reproducing section 10 recording and reproducing a recording medium such as a DVD, a surround decoder 14 obtaining a surround sound field signal, a power amplifier 15 amplifying a signal outputted to each speaker for 5-1 channel Dolby sound, a controller 13 controlling the DVD recording and reproducing section 10 and the surround decoder 14, and an MPEG (Moving Picture Experts Group) decoder 11 compressing a video signal from the DVD 10 and outputting the compressed video signal to the CRT 12. The recording and reproducing apparatus main body 3 outputs a surround phonic sound signal to each of the surround system speakers through an output terminal 18.

Reference symbol 4 denotes a speaker box containing a front left speaker (to be referred to as "FLS" hereinafter), 5 denotes a speaker box containing a front right speaker (to be referred to as "FRS" hereinafter), 6 denotes a center speaker (to be referred to as "CS" hereinafter), 7 denotes a woofer speaker without directivity, 8 denotes a speaker box containing a rear left speaker (to be referred to as "RLS" hereinafter), and 9 denotes a speaker box containing a rear right speaker (to be referred to as "RRS" hereinafter). The audience 2 is located to face the FLS, FRS and CS with the RLS and RRS arranged on rear left and right sides of the audience 2 and the WS arranged diagonally in the front left direction of the audience 2 so that the audience 2 can enjoy surround phonic sound.

As stated above, at least five speakers FLS, FRS, CS, RLS and RRS as well the WS are required to listen to surround phonic sound from the surround system speakers, and cables 16 connecting a main amplifier, a multichannel amplifier and the respective speaker with one another are scattered unseemly.

In addition, once a DVD player or the like is contained in a rack provided under the television receiver constituting the electronic equipment main body 3 and the DVD player or the like and the television receiver 17 are set up to be mutually connected, it is quite difficult and inconvenient to move them from a room in which the television receiver 17 and the DVD player or the like are set up, to another room. The same thing is true for a minicomponent or a high fidelity (hi-fi) audio system. That is, if the minicomponent or the hi-fi audio system is set on a desk or a dedicated rack, it is difficult to move it, making it impossible to effectively utilize the speakers.

The present invention has been made to solve the above-stated disadvantages. It is, therefore, an object of the present invention to provide a multichannel acoustic signal reproducing apparatus which can be freely moved from one room to another room, which can connect an electronic equipment main body to a plurality of speakers by one cable or wirelessly and which facilitates enjoying surround phonic sound.

SUMMARY OF THE INVENTION

The first invention is a multichannel acoustic signal reproducing apparatus of a movable type, capable of reproducing surround phonic sound and having at least three-dimensional speakers, characterized by comprising: output means for driving left and right main channel speakers.

The second invention is a multichannel acoustic signal reproducing apparatus characterized by comprising at least: a center speaker; left and right speakers separable from a housing; recording and reproducing means capable of recording and reproducing a recording medium; surround decoding means for decoding a multichannel acoustic signal from the recording and reproducing means to surround phonic sound; switching means for reproducing a predetermined number of channels of the multichannel acoustic signal through the center speaker and the left and right speakers, and switching and outputting remaining channels of the multichannel acoustic signal; and control means for controlling the recording and reproducing means, the surround decoding means and the switching means, and characterized in that channel signals of the remaining channels from the switching means are supplied to a target having speakers and capable of recording the channel signals, and reproduced as surround phonic sound through the control means, the target being a television receiver or an acoustic equipment.

The third invention is a multichannel acoustic signal reproducing apparatus according to the first or the second of the invention, characterized in that an output signal from the output means is transmitted to the target having the main speakers by a wire consisting of one wire or wirelessly; and the speakers of the multichannel acoustic signal reproducing apparatus are used as rear speakers.

According to the multichannel acoustic signal reproducing apparatus of the present invention, even after a home surround system is moved to another room, a home theater can be easily established.

DETAILED DESCRIPTION OF THE PREFERRED EMBODIMENTS

The embodiments of a multichannel acoustic signal reproducing apparatus according to the present invention will be described hereinafter with reference to the drawings.

Figure 1A:
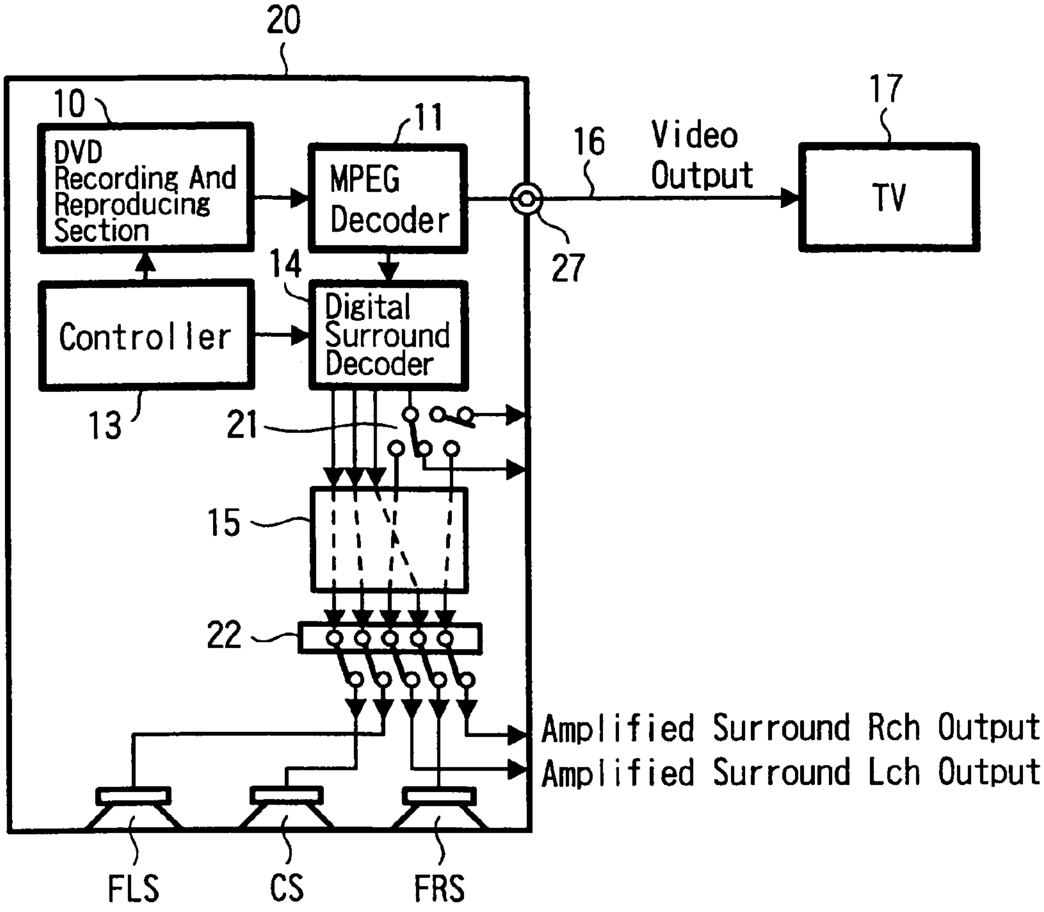
FIG. 1A is a system diagram showing one embodiment of a multichannel acoustic signal reproducing apparatus according to the present invention.
Figure 1B:
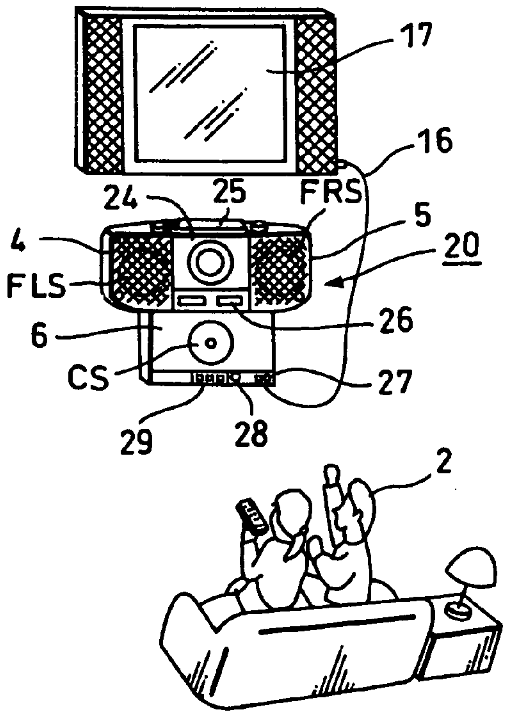
FIG. 1B is a schematic perspective view showing the arrangement of an acoustic signal reproducing apparatus main body in the multichannel acoustic signal reproducing apparatus shown in FIG. 1A.

FIGS. 1A and 1B are a system diagram of a multichannel acoustic signal reproducing apparatus in one embodiment and a perspective view showing the overall constitution of the apparatus.

In FIGS. 1A and 1B, reference symbol 20 denotes a multichannel acoustic signal reproducing apparatus main body (to be referred to as "main body" hereinafter) showing one embodiment of the present invention. This main body 20 includes at least IC's, i.e., a DVD recording and reproducing section 10 recording and reproducing a DVD, a power amplifier 16, a digital surround decoder 14, a controller 13, an MPEG decoder 11 and the like. If necessary, this main body 20 also includes a CD (compact disk), a CD-ROM (compact disk read-only memory), an MD (mini-disk), a recording and reproducing apparatus capable of recording and reproducing a tape cassette or the like, an AM/FM radio, a tuner and/or the like.

Further, the main body 20 includes the first switching means 21, such as switches, switching and outputting digital data before being amplified from the digital surround decoder 14 inside and outside of the main body 20 and driving various types of surround system speakers, and the second switching means 22, such as switches, switching and outputting analog signals amplified by the power amplifier 15 or the like and driving various types of surround system speakers.

The housing 24 of the main body 20 is constituted to be thin in a depth direction as in the case of a wall TV 17 or the like. Speaker boxes 4 and 5 containing an FLS and an FRS which are left and right speakers, respectively and a speaker box 6 containing a CS consisting of a woofer speaker for ultra bass sound are also constituted to be thin. A grip 25 is provided on the top plate of the housing 24 for portable purposes.

A lid which is freely opened and closed is provided on the front surface of the housing 24 so that the DVD can be inserted from the lid. In FIG. 1B, an insertion port 26 for a recording medium such as an MD or a cassette is provided and the speaker boxes 4 and 5 respectively containing the left and right speakers are detachable from the housing 24.

Digital data terminals 27 and 28 for interfaces such as an IEEE (Institute of Electrical and Electronic Engineers 1394–1995 (to be referred to as "ITE" hereinafter)) interface and USB (Universal Serial Bus) 1.0, 2.0 or the like, and an analog input/output terminal 29 such as an S terminal are provided on the lower portion of the speaker box 6 containing the CS.

FIGS. 1A and 1B show a system in which the main body 20 is provided below the wall TV 17 in front of an audience 2, and in which the digital data terminal 27 of the main body 20 is connected to the TV 17 by one cable through the ITE interface. In this case, the audience 2 appreciates music with a system as a three-dimensional system.

Figure 2A:
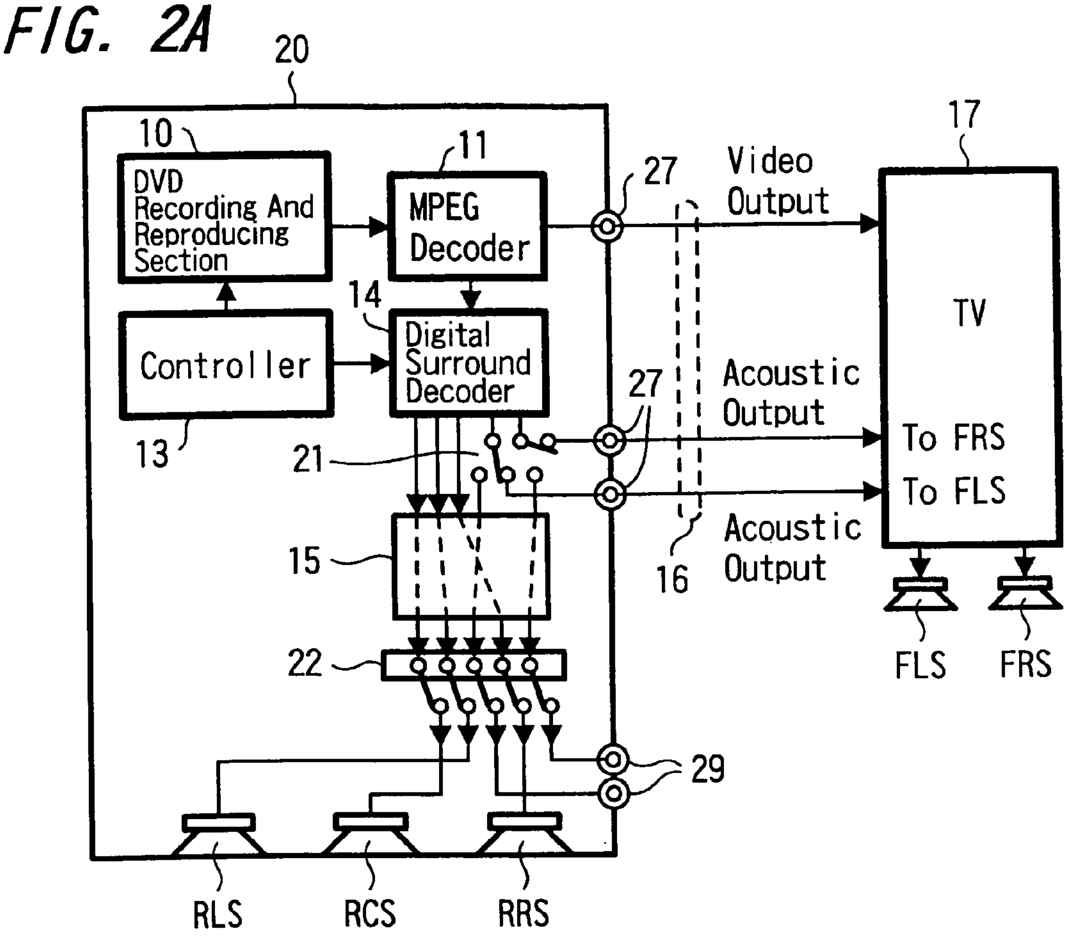
FIG. 2A is a system diagram showing another embodiment of a multichannel acoustic signal reproducing apparatus according to the present invention.
Figure 2B:
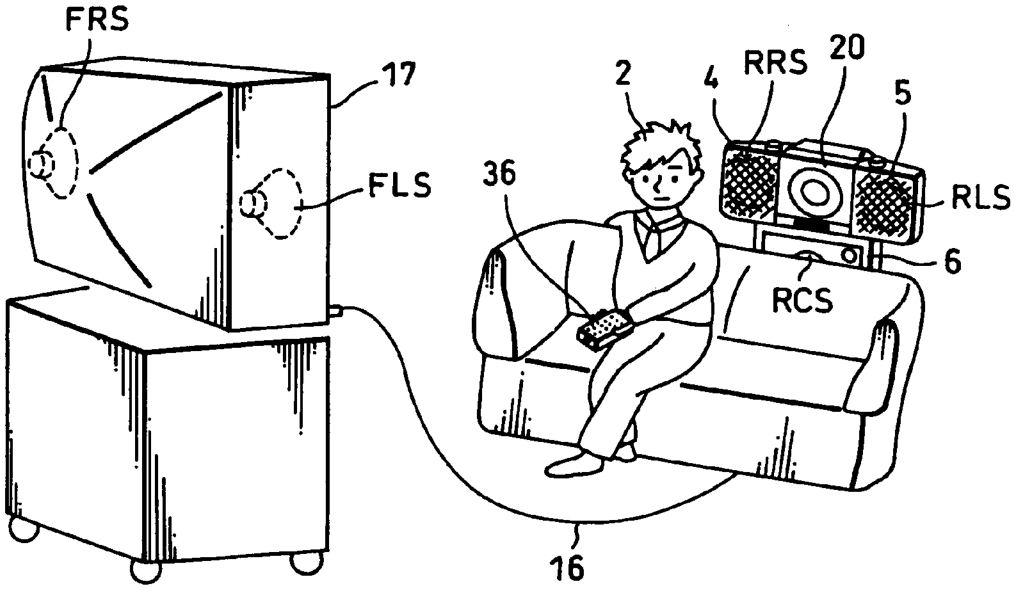
FIG. 2B is a schematic perspective view showing the arrangement of an acoustic signal reproducing apparatus main body in the multichannel acoustic signal reproducing apparatus shown in FIG. 1B.

FIGS. 2A and 2B show another embodiment of the present invention. In this embodiment, a main body 20 is provided at the back of an audience 2 watching TV 17 so that the audience can appreciate surround phonic sound. In this case, similarly to the preceding case, it suffices to digitally supply video outputs and voice outputs from a digital data terminal 27 (or 28) for an interface such as ITE or USB to a TV 17-side target through one cable 16, thus quite facilitating handling. Left and right speakers FRS and FLS provided on the front portion of the TV 17 are used as main speakers, and left and right speakers FRS and FLS in the main body 20 are used as rear speakers RRS and RLS, respectively, and a CS is used as a RCS which emits sound right behind the audience 2.

In this case, after a power amplifier 15 amplifies signals, the second switching means 22 is switched as shown in FIG. 2A to thereby drive the RLS, RRS and RCS in the main body 20, and the first switching means 21 is switched as shown in FIG. 2A to thereby supply digital output which is not amplified yet from a digital surround decoder 14 to the TV 17-side FRS and FLS. In this case, a D/A converter and a power amplifier are provided on the TV 17-side.

Figure 3A:
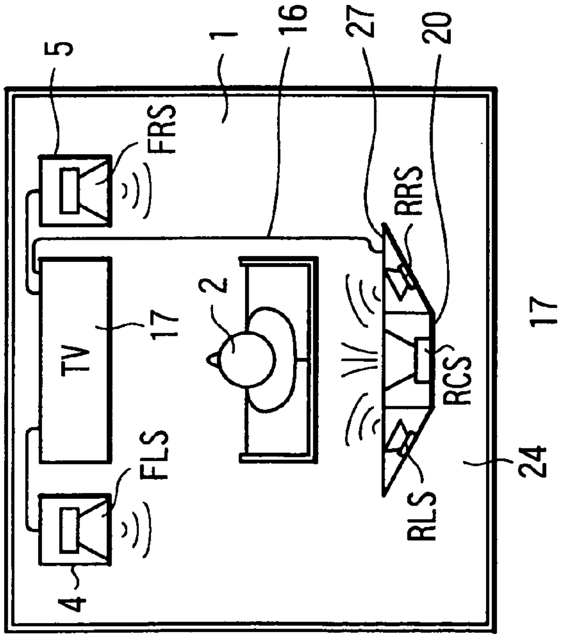
FIGS. 3A to 3D are schematic views showing various examples of the arrangement of the multichannel acoustic signal reproducing apparatus according to the present invention.

FIGS. 3A to 3D show conceptual views showing examples of the arrangement of speakers if transmitting digital outputs with the main body 20 put at the back of or side of the audience 2 as in the case of FIGS. 2A and 2B. In FIG. 3A, the main body 20 is provided at the back of the audience 2, the ITE terminal 27 of the main body 20 is connected to the TV 17 by one cable 16, the TV 17 side is controlled by the main body 20 side and reproduction is performed while the RLS and RRS are attached to the housing 24.

Figure 3B:
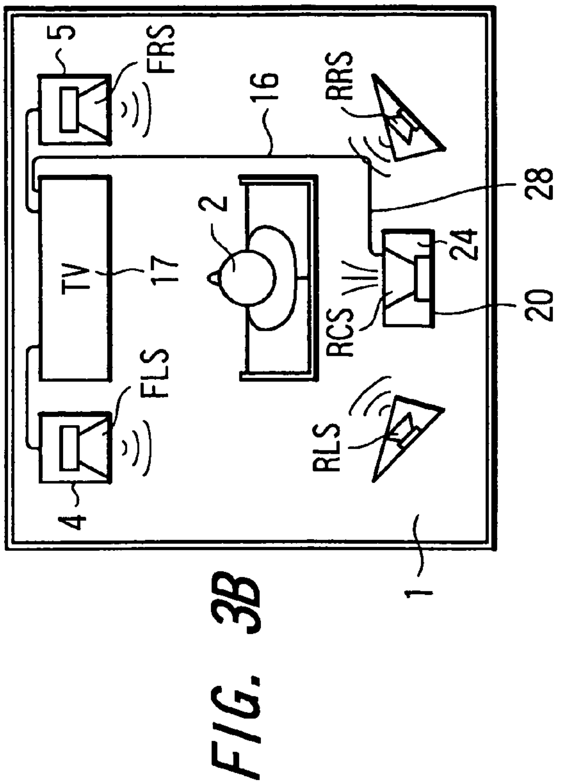

FIG. 3B shows a case where the USB terminal 28 of the main body 20 is connected to the TV 17 by one cable 16, the TV 17 side is controlled by the main body 20 side, and the RLS and RRS are provided on the left and right sides of and separated from the housing 24 so as to enhance rear surround effect.

Figure 3C:
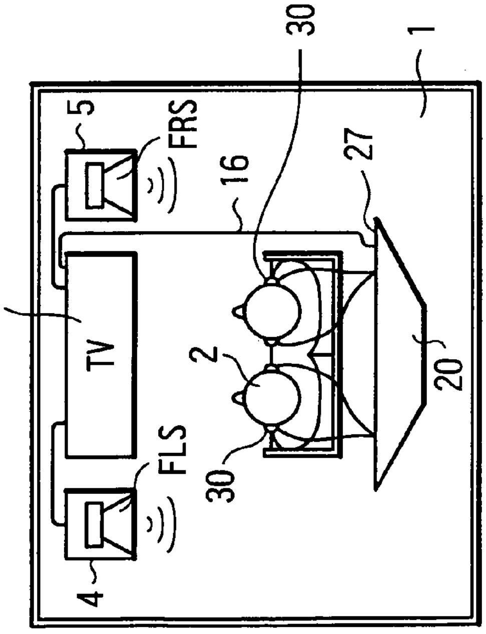

FIG. 3C shows a case where the main body 20 is provided at the back of the audience, the ITE terminal 27 of the main body 20 is connected to the TV 17 by one cable 16 and the audience watches the screen of the TV 17 while using headphones 30.

Figure 3D:
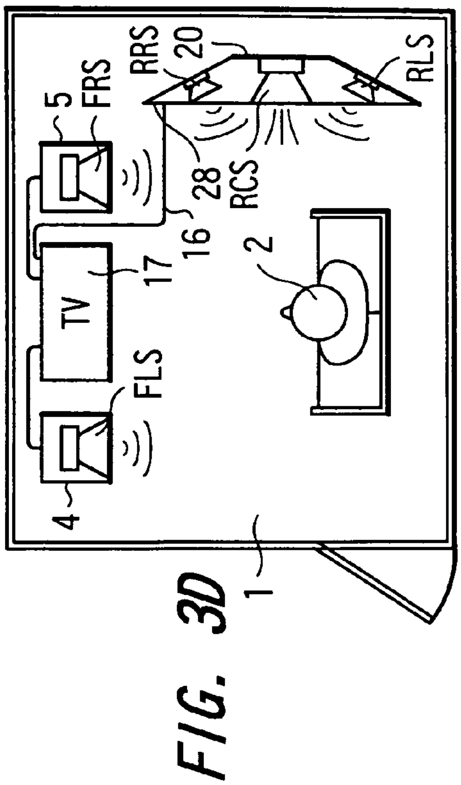

FIG. 3D shows a case where the sound field space 1 in the room is narrow, the main body 20 is moved to the right side of the audience 2 and the TV 17 is connected to the USB terminal 28 of the main body 20 by one cable 16. Even in such an arrangement as shown in FIG. 3D, the audience 2 can sufficiently enjoy surround phonic sound.

In the arrangement examples of FIGS. 2A, 2B and FIGS. 3A to 3D stated above, a commander 36 is operated toward the main body 20 side at the back of the audience 2. In this case, since the main body 20 is located near a sofa, manual operation can be performed relatively easily.

Figure 4A:
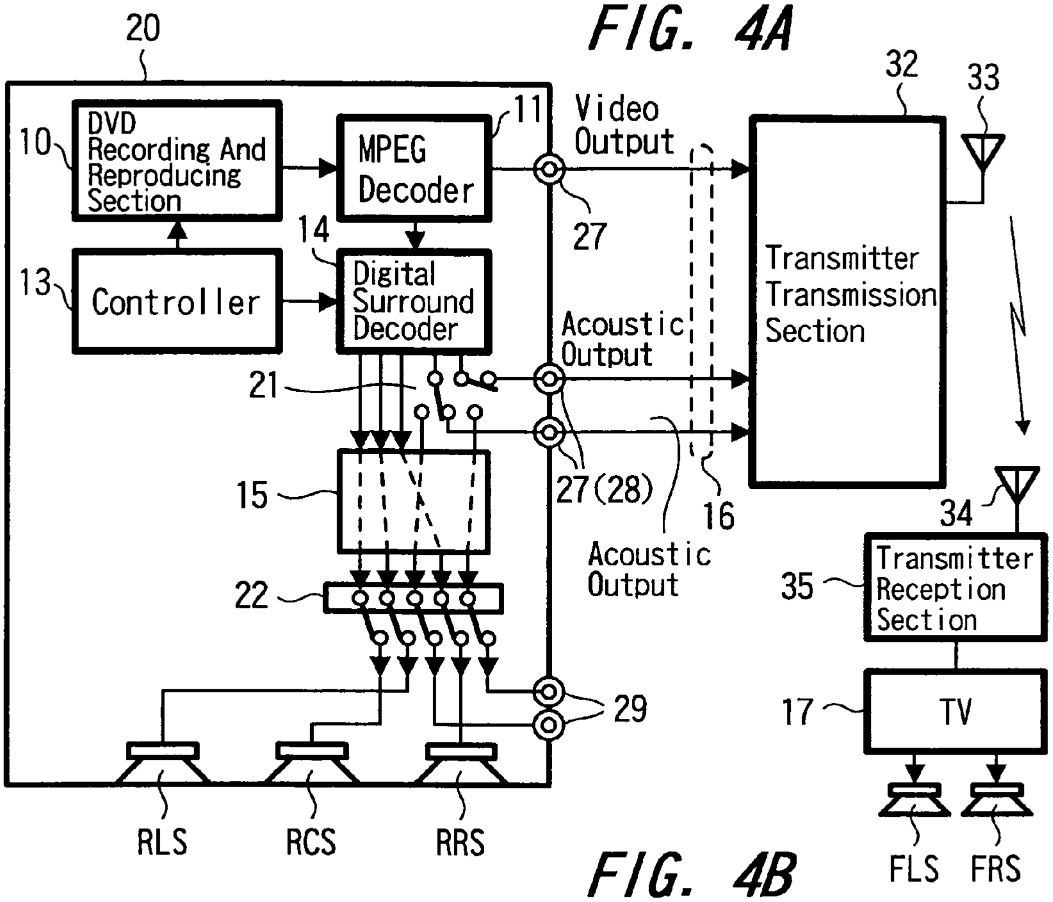
FIGS. 4A and 4B are system diagrams showing yet other embodiments of a multichannel acoustic signal reproducing apparatus according to the present invention.

While the ITE, USB 1.0 and USB 2.0 wires are used to obtain surround phonic sound according to the systems shown in FIGS. 3A to 3D, the systems shown in FIGS. 3A to 3D can be replaced by a system for transmitting signals wirelessly, i.e., by an IEEE1394 wireless interface, a Blue Tooth interface or the like as shown in FIG. 4A.

Namely, as shown in FIG. 4A, if a transmitter transmission section 32 and a transmission antenna 33 each having a Bluetooth interface, for example, are provided on a main body 20 side and a transmitter reception section 35 and a reception antenna 34 are provided on a TV 17 side, thereby realizing wireless transmission. In this case, the transmitter transmission section 32 is included in a housing 24.

Figure 4B:
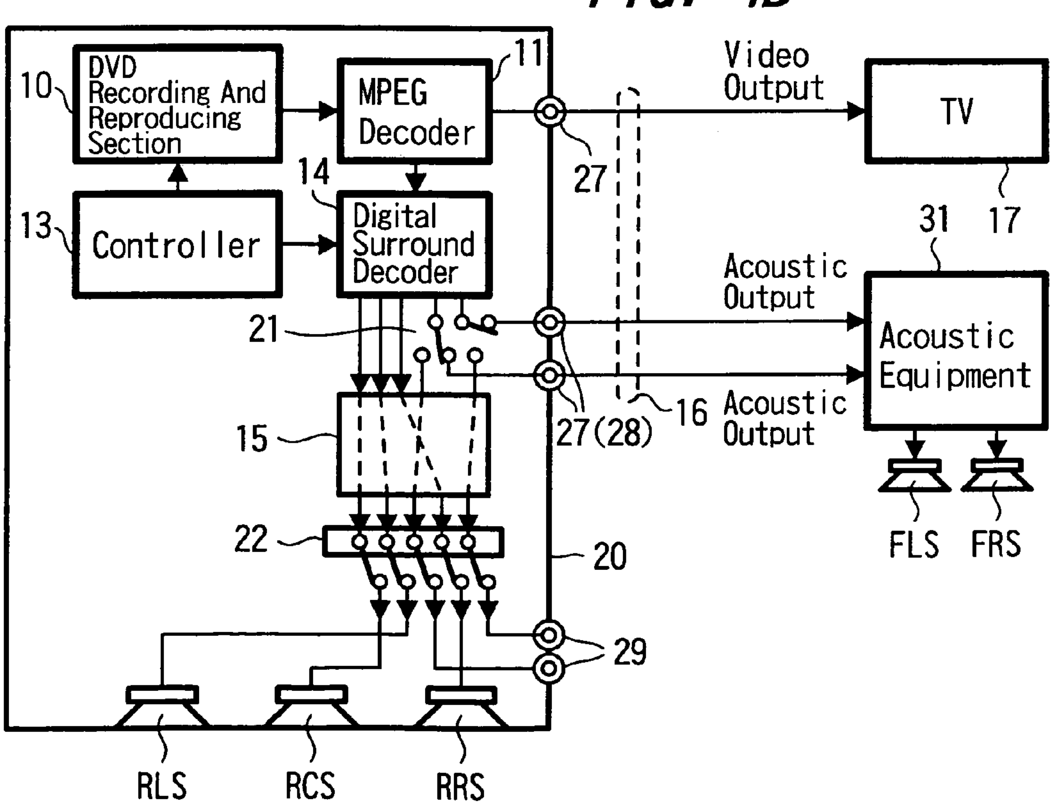

FIG. 4B shows yet another embodiment of the present invention. In FIG. 4B, a main body 20 is arranged at the back of an audience 2 and connected to a TV 17, and voice signals are supplied to an acoustic equipment 31 such as a minicomponent provided in front of the audience 2 without using TV speakers.

Figure 5A:
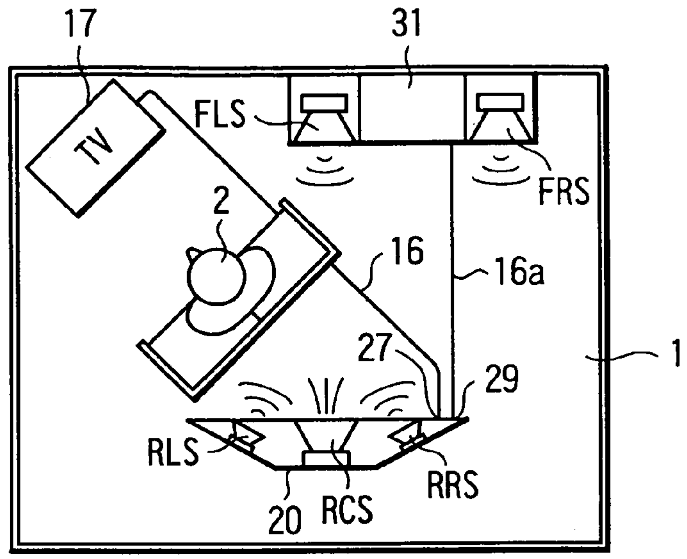
FIGS. 5A to 5C are schematic view showing other examples of the arrangement of the multichannel acoustic signal reproducing apparatus according to the present invention.
Figure 5B:
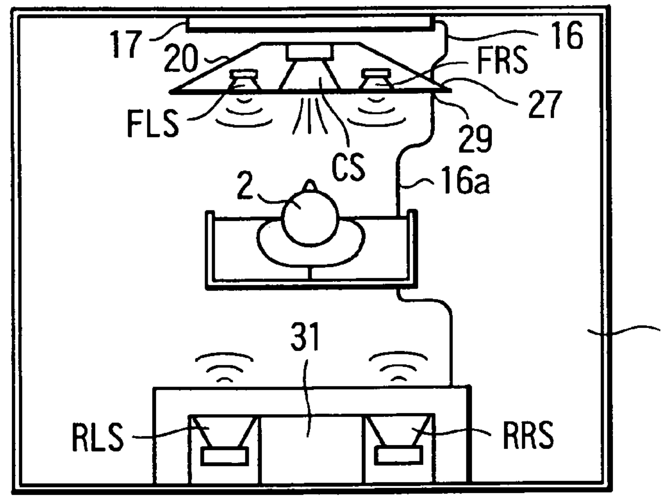
Figure 5C:
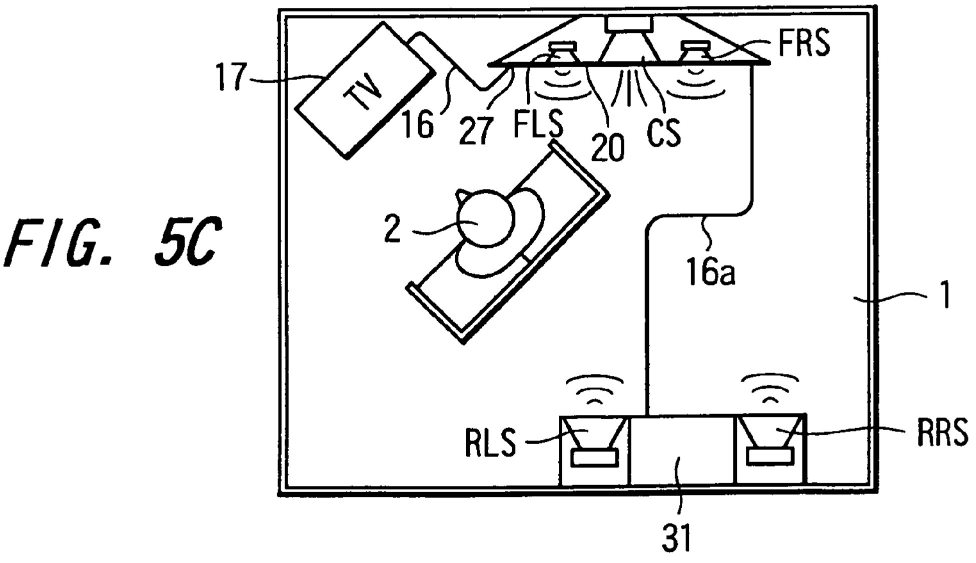
Figure 6A:
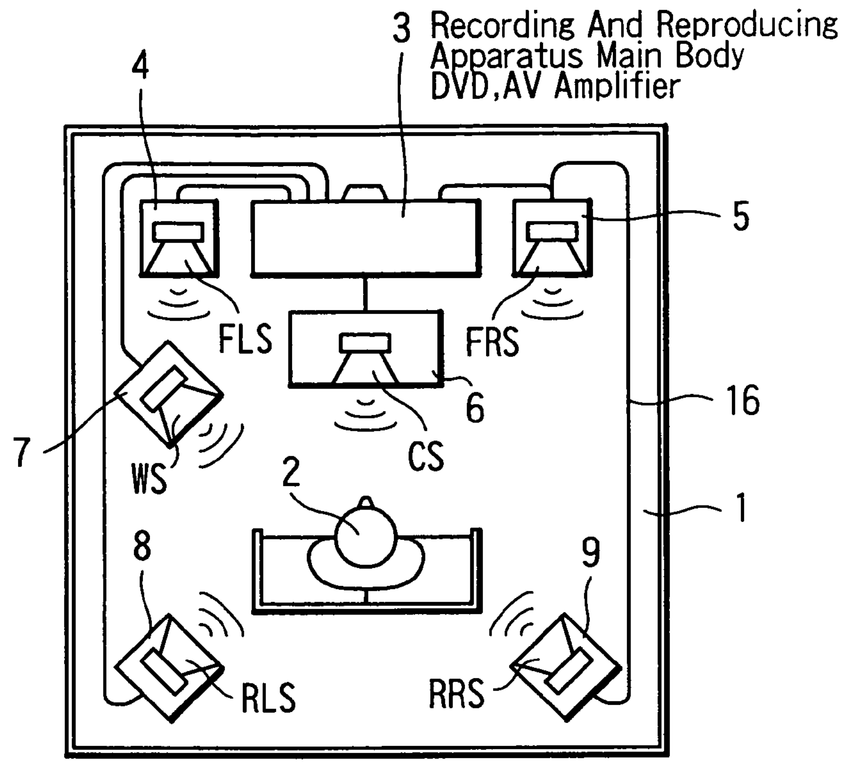
FIG. 6A is an arrangement view showing a conventional multichannel acoustic signal reproducing apparatus.
Figure 6B:
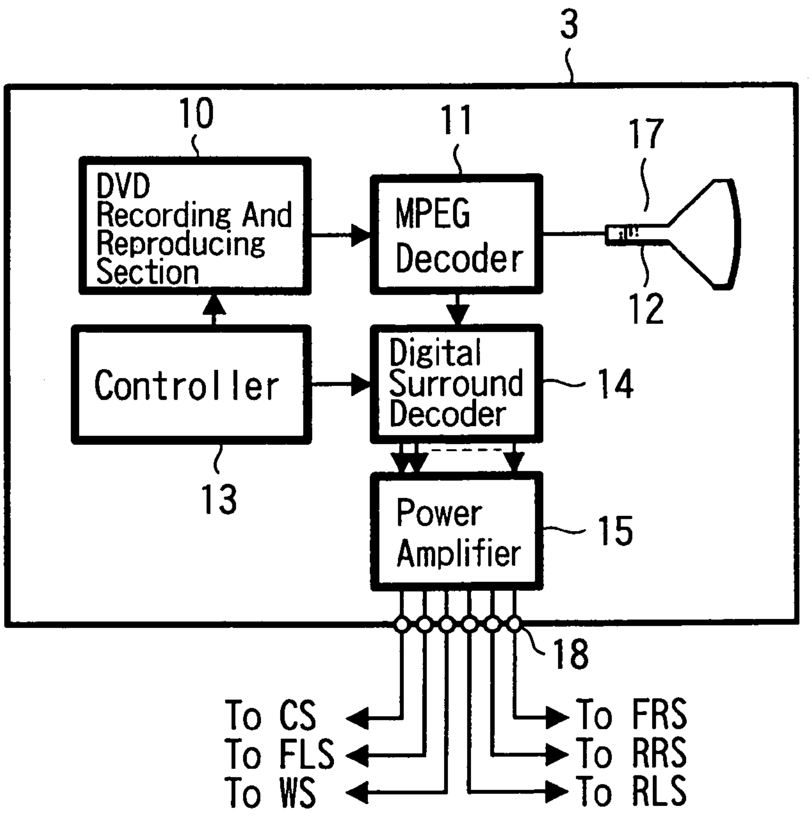
FIG. 6B is a system diagram of the conventional multichannel acoustic signal reproducing apparatus shown in FIG. 6A.

FIGS. 5A to 5C show examples of the arrangement of speakers for obtaining surround phonic sound if an acoustic space 1 is small by using a combination of the speakers of the acoustic equipment 31 such as a minicomponent and the speakers of the main body 20 of the present invention.

In case of FIG. 5A, the speakers of the TV 17 are provided in the corner of the room, the FLS and FRS of the acoustic equipment 31 provided on the right side of the audience 2 are used as main channel speakers, the speakers of the main body 20 are used as rear speakers RLS, RRS and RCS, the analog input/output terminal 29 of the main body 20, for example, is connected to the acoustic equipment 31 by a cable 16*a* and the TV 17 is connected to the ITE terminal 27 of the main body 20 by a cable 16.

In case of FIG. 5B, the main body 20 is moved to the front of the audience 2 as in the case of FIG. 1B, the main body 20 is connected to the TV 17 by a digital cable 16, the FLS, CS and FRS of the main body 20 are used as main channel speakers and the speakers of the acoustic equipment 31 are used as rear speakers RLS and RRS.

In case of FIG. 5C, opposite to FIG. 5A, the speakers of the main body 20 are used as main channel speakers FLS, CS and FRS, the speakers of the acoustic equipment 31 are used as rear speakers RLS and RRS and the main body 20 is provided on the right side of the audience 2.

The connections and combinations of the main body, the target and the electronic equipment of various types according to the present invention other than those described in the above embodiments can be realized and various changes and modifications can be made within the scope of the present invention.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A multichannel acoustic signal reproducing apparatus comprising:

a portable housing having a hand grip for portable purposes;

a center speaker arranged in the portable housing;

left and right speakers separably attached to the portable housing;

recording and reproducing means arranged in the portable housing capable of recording and reproducing a recording medium;

surround decoding means arranged in the portable housing for decoding a multichannel acoustic signal from the recording and reproducing means to produce surround phonic sound;

second switching means arranged in the portable housing for reproducing a first predetermined number of channels of the multichannel acoustic signal from the surround decoding means through the center speaker and the left and right speakers, and first switching means for switching and outputting remaining channels of the multichannel acoustic signal from the surround decoding means; and control means for controlling the recording and reproducing means and the surround decoding means, in which channel signals of the remaining channels from the first switching means are supplied to a television receiver having speakers and capable of reproducing the channel signals as surround phonic sound in conjunction with the left, right, and center speakers, in which the television receiver is arranged in a housing separate from the portable housing.

2. A multichannel acoustic signal reproducing apparatus comprising:

a portable housing having a hand grip for portable purposes;

a center speaker arranged in the portable housing;

left and right speakers separably attached to the portable housing;

recording and reproducing means arranged in the portable housing capable of recording and reproducing a recording medium;

surround decoding means arranged in the portable housing for decoding a multichannel acoustic signal from the recording and reproducing means to produce surround phonic sound;

second switching means arranged in the portable housing for reproducing a first predetermined number of channels of the multichannel acoustic signal from the surround decoding means through the center speaker and the left and right speakers, and first switching means for switching and outputting remaining channels of the multichannel acoustic signal from the surround decoding means; and control means for controlling the recording and reproducing means and the surround decoding means, in which channel signals of the remaining channels from the first switching means are supplied to a television receiver having speakers and capable of reproducing the channel signals as surround phonic sound in conjunction with the left, right, and center speakers, in which the channel signals from the first switching means are fed to the television receiver by a single cable; and the left, right, and center speakers are used as rear speakers and are located behind the user.

3. The multichannel acoustic signal reproducing apparatus of claim 1 in which the channel signals from the first switching means are fed to the television receiver over a wireless channel.

4. The multichannel acoustic signal reproducing apparatus of claim 1 in which the channel signals from the first switching means are fed to the television receiver over an Institute of Electrical and Electronic Engineers (IEEE) 1394 interface.

5. The multichannel acoustic signal reproducing apparatus of claim 1 in which the channel signals from the first switching means are fed to the television receiver over a universal serial bus (USB) interface.

6. The multichannel acoustic signal reproducing apparatus of claim 1 further comprising a Moving Picture Experts Group (MPEG) decoding means arranged in the portable housing capable of decoding a video signal from the recording and reproducing means to produce decoded video output.

7. The multichannel acoustic signal reproducing apparatus of claim 6 in which the decoded video output is fed to the television receiver over a single cable.

8. The multichannel acoustic signal reproducing apparatus of claim 6 in which the decoded video output and the channel signals from the first switching means are fed to the television receiver over a single cable.

9. The multichannel acoustic signal reproducing apparatus of claim 2 in which the channel signals from the first switching means are fed to the television receiver over a wireless channel.

10. The multichannel acoustic signal reproducing apparatus of claim 2 in which the channel signals from the first switching means are fed to the television receiver over an Institute of Electrical and Electronic Engineers (IEEE) 1394 interface.

11. The multichannel acoustic signal reproducing apparatus of claim 2 in which the channel signals from the first switching means are fed to the television receiver over a universal serial bus (USB) interface.

12. The multichannel acoustic signal reproducing apparatus of claim 2 further comprising a Moving Picture Experts Group (MPEG) decoding means arranged in the portable housing capable of decoding a video signal from the recording and reproducing means to produce decoded video output.

13. The multichannel acoustic signal reproducing apparatus of claim 2 in which the decoded video output is fed to the television receiver over a single cable.

14. The multichannel acoustic signal reproducing apparatus of claim 13 in which the decoded video output is fed to the television receiver over a single cable.

15. The multichannel acoustic signal reproducing apparatus of claim 14 in which the decoded video output and the channel signals from the first switching means are fed to the television receiver over a single cable.

* * * * *

UNITED STATES PATENT AND TRADEMARK OFFICE

CERTIFICATE OF CORRECTION

PATENT NO. : 7,146,018 B2
APPLICATION NO. : 09/929326
DATED : December 5, 2006
INVENTOR(S) : Ryuzo Tamayama It is certified that error appears in the above-identified patent and that said Letters Patent is hereby corrected as shown below:

Column 8, Line 17 delete “14” and in its place insert --13--.

Signed and Sealed this

Fourth Day of September, 2007

JON W. DUDAS

*Director of the United States Patent and Trademark Office*